United States Patent [19]

D'Amato et al.

[11] 3,950,289

[45] Apr. 13, 1976

[54] ANTIFOGGING POLYMERIC FILM

[75] Inventors: Anthony S. D'Amato, Chlemsford; Miles N. Gattenby, Jr., Lowell, both of Mass.

[73] Assignee: Borden, Inc., Columbus, Ohio

[22] Filed: Aug. 11, 1969

[21] Appl. No.: 849,211

Related U.S. Application Data

[63] Continuation-in-part of Ser. No. 417,776, Dec. 11, 1964, Pat. No. 3,479,308.

[52] U.S. Cl. ............. 260/23 XA; 106/13; 252/70; 260/23 R; 260/31.6; 260/33.2 R; 260/92.8 A; 426/415

[51] Int. Cl.$^2$ .. C08K 5/06; C08K 5/10; C08L 27/06

[58] Field of Search ...... 260/23 X, 31.4, 31.6, 33.2, 260/87.1, 92.8 A, 23 XA, 33.2 R; 99/174; 106/13; 252/70, 356; 426/415

[56] References Cited

UNITED STATES PATENTS

| | | | |
|---|---|---|---|
| 2,539,012 | 1/1951 | Diamond et al. | 252/70 |
| 2,657,186 | 10/1953 | Klein et al. | 260/23 |
| 2,676,943 | 4/1954 | Carson | 260/31.8 |
| 3,391,129 | 7/1968 | Sparks | 260/86.7 |
| 3,425,976 | 2/1969 | Adams et al. | 260/23 |
| 3,479,308 | 11/1969 | Gattenby, Jr. et al. | 260/23 |
| 3,542,713 | 11/1970 | Gillio-Tos | 260/23 |

OTHER PUBLICATIONS

Rose et al., The Condensed Chemical Dictionary, 7th Edition, 1966, p. 984.

*Primary Examiner*—Donald E. Czaja
*Assistant Examiner*—R. A. White
*Attorney, Agent, or Firm*—George A. Kap; George P. Maskas; Daniel D. Mast

[57] ABSTRACT

This invention relates to polymerized polymeric vinyl films containing a minor portion of an anti-fogging and anti-tackifying agent, said agent comprising a partial ester of a water soluble $C_{2-6}$ polyol with a $C_{12-18}$ aliphatic monocarboxylic acid, a polyalkoxylated derivative of a partial ester of a water soluble $C_{2-6}$ polyol with a $C_{12-18}$ aliphatic monocarboxylic acid, the alkoxy groups therein having each 2–3 carbon atoms and the number of alkoxy groups being about 3–30 per molecule of said alkoxylated partial ester and in combination with both or each of the aforementioned partial esters, polyalkoxylated alkyl phenol, the alkoxy groups therein having each 2–4 carbon atoms and the number of alkoxy groups being about 3–50 per molecule.

4 Claims, No Drawings

ANTIFOGGING POLYMERIC FILM

RELATED APPLICATIONS

This application is a continuation-in-part of Ser. No. 417,776, filed Dec. 11, 1964, now U.S. Pat. No. 3,479,308 inventors, Miles N. Gattenby and Anthony S. D'Amato, entitled, "Anti-fogging Film Comprising Vinyl Chloride Polymer and Fatty Acid Esters."

DETAILED DESCRIPTION OF THE INVENTION

This invention relates to plasticized polymeric vinyl materials and more particularly to plasticized vinyl chloride polymers having improved properties when formed into films. Polymer films or sheets are widely used to package food products because of their ease of handling, inherent viewability and elimination of the sanitary problem. Some examples of such films include cellophane, rubber hydrochloride, polypropylene, polyethylene, polyvinyl chloride and various interpolymers and mixtures of polymers of vinyl halides, acetates, alcohols and acrylates. When polymeric films are used to package food products, and particularly fresh meat products, and the packages are subsequently stored for display in refrigerated units, certain disadvantages become evident. Within temperature ranges normally found in such refrigeration units, about 25°F – 40°F, the depressed vapor pressure of water results in precipitation of fine droplets of moisture on the surfaces of the film. The resulting droplets remain substantially in a non-coalesced state and thus gives the appearance of layer of fog above the food product which the film protects. The term "fog" is in fact commonly used to describe this occurrence. The presence of fog is particularly objectionable from the point of view of selling the products as it effectively bars the potential customer's view of the item which he seeks to purchase. It is an additional requirement of the wrapper film that when the food on display is a red meat item such as beef, that it be sufficiently permeable to oxygen as to allow oxidation of the hemoglobins in the blood of fresh red meat in order to have the meat retain its red surface color. The red color is usually required to last up to three days at refrigeration temperatures. Insufficient oxygen permeability results in a rapid and undesirable darkening of the meat.

The oxygen permeability rate through a polymeric vinyl film will be enhanced by an increase in the amount of plasticizer added to the resin. Generally, for food articles which do not require the high oxygen permeability rate desired when red meats are packaged in polymeric films, plasticizer concentrations in the order of about 25 percent by weight of the polymeric resin are deemed acceptable. Increasing the oxygen permeability rate by increasing the quantity of plasticizer in the polymer composition however, results in a blocky film. Blocky is a characteristic of polymeric films which defines its tackiness or stickiness. When a film which has relatively high blocking is rolled on to a spool, adjacent layers of film adhere thereby rendering the spool useless.

The present invention provides polymeric vinyl film or sheet which is non-fogging, has anti-blocking properties, and has increased oxygen permeability at the refrigeration temperatures and humidities to which such films are exposed during use.

Briefly stated, the present invention is a polymeric composition and film or sheet made therefrom comprising plasticized polymeric vinyl material and an antifogging and anti-tackifying agent. Other components may be included such as stabilizers, color additives and materials well known in this art.

The anti-fogging and anti-tackifying agent comprises a partial ester of a water soluble polyol and aliphatic monocarboxylic acid (hereinafter referred to as partial ester 1), a polyalkoxylated derivative of a partial ester of a water soluble polyol and aliphatic monocarboxylic acid (hereinafter referred to as partial ester 2) and in combination with each alone or both partial esters 1 and 2 referred to above a polyalkoxylated alkyl phenol (referred to as componant 3).

Partial ester 1 is a partial ester (such as mono-ester) of a water soluble $C_{2-6}$ polyol which polyol contains at least two alcohol groups. A minimum of one on the average of such alcohol groups are not reacted with acid to form the ester and at least one of such alcohol groups are reacted with acid to form the ester. The polyol component of this partial ester may be glycerol; ethylene, propylene or other $C_{2-4}$ glycols; trimethylol propane; sorbitol; and the like. The acid component may be any $C_{12-18}$ aliphatic monocarboxylic acid, examples of which are lauric, palmitic, oleic, stearic and like acids.

Partial ester 2 is a polyalkoxylated derivative of a partial ester of a water soluble $C_{2-6}$ polyol which polyol contains at least two alcohol groups. A minimum of one on the average such alcohol groups are not reacted with acid to form the ester, and at least one of such alcohol groups are reacted with acid to form the ester. The polyol component of this partial ester may be glycerol; ethylene; propylene or other $C_{2-4}$ glycols; trimethyl propane; sorbitol; sorbitan and the like. The acid component may be a $C_{12-18}$ aliphatic monocarboxylic acid examples of which are lauric, palmitic, oleic, stearic and like acids. The alkoxylated groups of said partial ester 2 each have between about 2–3 carbon atoms, per repeating alkoxy unit. The number of alkoxylated groups may be between about 3–30 per molecule of the alkoxylated partial ester. Illustrative examples are polyoxyethylene soribitan monooleate, polyoxypropylene propylene glycol monooleate, and the corresponding stearates, laurates, palmitates etc., said partial esters having 5–25 alkoxylated groups to the molecule are usually preferred. The best results are generally obtained with polyoxyethylene sorbitan monooleate having about 20 oxyethylene groups to the molecule.

The polyalkoxylated alkyl phenols contemplated for use are those prepared by condensation of one mole of alkyl phenol with an average of 3–50 moles of a $C_2$-$C_4$ alkylene oxide having an oxirane group therein. The phenol can be substituted in one or more positions with alkyl groups in the meta, ortho, or para positions. It is preferred to use about 5–15 moles of alkylene oxide.

The alkyl group can have from 1–12 carbons such as methyl, ethyl, butyl, di-sec-butyl, octyl, isopropyl, dodecyl and the like. Exemplary of these polyalkylene oxide ethers are alpha-di-sec-butylphenyl-omega-hydroxypoly-(oxyethylene), alpha-isopropyl-omega-hydroxypoly-(oxyethylene), alpha-(p-Nonylphenyl)-omega-hydroxypoly-(oxyethylene), alpha-(p-Dodecylphenol)-omega-hydroxypoly-(oxyethylene), alpha-dipentyl-omega-hydroxypoly-(oxyethylene) and the like.

These polyoxyalkylene ethers can be prepared by known procedures and are available commercially under many different tradenames, exemplary of which are Adsee 50, Triton X100 Advawet 10, Depcopal, Tergitol NP 33 and Igepal CA 520.

The preferred alkoxylating agent is ethylene oxide. However, isopropylene oxide, propylene oxide, butylene oxide and the like can also be employed.

It has been found that superior anti-fogging and anti-blocking properties accompanied by some increase in oxygen permeability can be imparted to a vinyl film by incorporating therein a modifying agent, comprising a composition of a polyalkoxylated alkyl phenol in combination with either or both partial ester 1 and partial ester 2.

When used together, the alkylene-oxide-ethers and partial esters 1 and 2 which make up the anti-fogging and anti-tackifying modifying agents of the present invention are used in the proportion of about 1–6 parts of partial ester 1, and at least 3 parts when anti-blocking is desired, about 0.5–5 parts of partial ester 2 and 0.5–5 parts of polyalkylene oxide ether each for 100 parts of the polymeric resin.

When relatively high proportions of common plasticizes are included in the film formulation in order to obtain greater gas diffusion throughout the film, it is preferred to have an excess of 2 parts and about at least 3 parts of partial ester 1 added to the film formulation in order to maintain the high level of anti-blocking properties of the film.

As exemplified, infra, in the tables, it is ordinarily preferred to use about 2–5 parts of partial ester 1, about 1–3 parts of partial ester 2, and 1–4 parts of polyalkylene-oxide-ether, the total being at least 4 parts when 40 or more parts of plasticizer are used. More than 15 parts total has been found to be both uneconomical and unnecessary.

The polymeric vinyl material used in the present invention includes polyvinyl chloride, polyvinyl acetate and copolymers and mixtures of copolymers, and mixtures of copolymers with homopolymers, and mixtures of homopolymers thereof. Examples of other copolymers that may be used are those of vinyl chloride with $C_{1-18}$ alkyl esters of alpha-unsaturated aliphatic acids having 3–5 carbon atoms to the molecule of said acid or vinyl chloride with up to 15% by weight $C_2$–$C_8$ straight or branched chain olefins. Examples of these alkyl esters include methyl, ethyl and octyl acrylate and methacrylate. Examples of olefins include propylene, alpha butylene, 2-pentene, hexene and the like. The homopolymer, polyvinyl chloride and copolymers and mixtures of homopolymers wherein the vinyl chloride moiety is present in major proportions gives satisfactory films for wrapping meats or the like.

We have found that a plasticized polymeric vinyl film which includes our anti-fogging and anti-tackifying agent said plasticizer being present in the proportion of between about 20 to 60 parts by weight per 100 parts of vinyl polymer resin, will result in a film or sheet having the desired properties.

The balance of the formulation may include a conventional plasticizer for polyvinyl chloride, ie, substantially nonvolatile solvents that are chemically inert to the resin, as, for example, di(2-ethylhexyl)adipate, acetyl tributylcitrate, epoxidized soybean oil, butyl phthalyl butyl glycolate, diisobutyl adipate, diphenyl (2-ethylhexyl) phosphate, butyl benzyl phthalate, and the like and mixtures thereof. The total plasticizer concentration in the vinyl film should generally be between about 20–60 parts by weight of plasticizer for 100 parts by weight of vinyl film and preferably between about 30–50 parts.

Other additives to the film composition may include usual stabilizers for polyvinyl chloride films such as for example triphenyl phosphate, nonylphenol, barium, cadmium, calcium and zinc salts of lauric and other fatty acids, and mixtures thereof.

There may also be included approved food colors to establish the color desired.

Generally, the polymeric vinyl resin, plasticizer and anti-fogging and anti-tackifying agent are heated and/or subjected to high shear and thus blended. Other additives, such as stabilizers and color modifiers may be added to the blend. When heat is used in blending, the temperature is such that it is sufficient to provide adequate penetration of the plasticizer and said agent into the vinyl resin. The solution is then extruded, drawn, blown or in any other convenient manner made into a film or sheet. The thickness of the film or sheet can be varied as desired however, we have found that a useful thickness for red meat films is between about 0.1 mil and 2 mils. Thicknesses greater than 2 mils may require additional plasticizer to attain the desired gas permeability rates.

In certain instances, depending upon the specific balance of anti-fogging and anti-blocking properties desired, it may be desirable to use partial ester 1 in combination with the polyalkylene-oxide-ether, omitting the use of partial ester 2. Thus, when vinyl films are used which are not highly plasticized, ie, contain from 20–30 parts by weight of plasticizer per 100 parts of vinyl polymer resin, the anti-fogging and anti-tackifying agent can be reduced to a 2 component system comprising partial ester 1 and polyalkylene-oxide-ether in proportions set forth in Table 2, infra.

In some instances, primarily dictated by economic considerations, it may by desirable to eliminate partial ester 1 thereby achieving good anti-fogging and anti-blocking properties by the use of polyalkylene-oxide-ether and partial ester 2 in proportions set forth in Table 3, infra.

The following tables show proportions of ingredients of the several classes as illustrative of proportions which can be used in the present invention and also those recommended for commercial use. It is understood that the ranges given in the tables are by way of example and not by way of limitation. The purpose of the table is to offer constructive assistance in formulating the desired film forming composition. Proportions here and elsewhere herein are expressed as parts by weight on a dry basis unless specifically stated to the contrary.

Table 1

Polyalkoxylated Alkyl Phenol
In Combination With Partial Esters 1 & 2

| Components | Parts by Weight | |
|---|---|---|
| | Illustrative | Recommended |
| Polyvinyl chloride resin | 100 | 100 |
| Partial ester 1* | 1 – 6 | 2 – 5 |
| Partial ester 2* | 0.5 – 5 | 1 – 3 |
| Alkoxylated alkyl phenol* | 0.5 – 5 | 1 – 4 |
| Plasticizer | 20 – 60 | 30 – 50 |

*Total: at least 4 parts when 40 or more parts of plasticizer are used.

Table 2

Polyalkoxylated Alkyl Phenol With Partial Ester 1

| Components | Parts by Weight | |
|---|---|---|
| | Illustrative | Recommended |
| Polyvinyl chloride resin | 100 | 100 |
| Partial ester 1* | 1 – 15 | 2 – 10 |
| Ethoxylated alkyl phenol* | 0.5 – 10 | 1 – 5 |
| Plasticizer | 20 – 60 | 20 – 30 |

*Total: at least 4 parts when 40 or more parts of plasticizer are used

Table 3

Polyalkoxylated Alkyl Phenol With Partial Ester 2

| Components | Parts by Weight | |
|---|---|---|
| | Illustrative | Recommended |
| Polyvinyl chloride resin | 100 | 100 |
| Partial ester 2* | 0.5 – 10 | 1 – 5 |
| Ethoxylated alkyl phenol* | 1 – 15 | 3 – 10 |
| Plasticizer | 20 – 60 | 30 – 50 |

*Total: at least 4 parts when 40 or more parts of plasticizer are used

The invention will be further illustrated by description in connection with the following examples. In these examples and illustrations herein proportions are expressed as parts by weight except where specifically stated to the contrary.

EXAMPLE 1

A mixture for a polyvinyl chloride film was prepared in the following proportions:

| Film Components | Parts by Weight |
|---|---|
| Polyvinyl Chloride | 100 |
| Di(2-ethylhexyl) adipate | 20 |
| Acetyl tri-n-butyl citrate | 15 |
| Epoxidized soybean oil | 10 |
| Glycerol monooleate | 3 |
| Polyoxylethylene (20) *sorbitan monooleate | 2 |
| Alpha-(p-Nonylphenyl)-omega-hydroxypoly-(oxyethylene)** | 3 |
| Calcium and zinc stearate stabilizer (1 Ca: 1 Zn) | 2 |

*Contains 20 $C_2H_4O$ groups per molecule
**Contains 18 $C_2H_4O$ groups per molecule

EXAMPLE 2

The procedure and composition of Example 1 are used except that the polyvinyl chloride resin is replaced by 100 parts of a copolymer of 90% vinyl chloride and 10% vinyl acetate. Film thickness is approximately 0.75 mil.

EXAMPLE 3

The procedure in composition of Example 1 are used except that partial ester 1 is replaced by 4 parts of ethylene glycol monolaurate and the alkoxylated alkyl phenol is 2 parts by weight of alpha-(p-Dodecylphenyl)-omega-hydroxypoly (oxyethylene) having 10 $C_2H_4O$ groups per molecule. Partial ester 2 remains the same. Film thickness is approximately 0.75 mils.

EXAMPLE 4

Procedure and composition of Example 1 are used except that partial ester 1 is 3 parts of glycerol monostereate, partial ester 2 is omitted and the alkoxylated alkyl phenol is 3 parts of alpha-di-sec-butyl-omega-hydroxypoly-(oxyethylene), containing 10 $C_2H_4O$ group per molecule.

EXAMPLE 5

The procedure and composition of Example 1 are used except that partial ester 1 is omitted. Partial ester 2 is 2 parts of polyoxyethylene (20) sorbitan monooleate containing 20 $C_2H_4O$ groups per molecule and the polyalkoxylated alkyl phenol is 3 parts alpha-(p-Nonylphenyl)-omega-hydroxypoly-(oxyethylene) containing 8 $C_2H_4O$ groups per molecule.

EXAMPLE 6

The procedure and composition of Example 5 are used except that the polyvinyl chloride is replaced by 100 parts of a mixture of 90 parts of polyvinyl chloride and 10 parts of polyvinyl acetate.

EXAMPLE 7

The procedure and composition of Example 1 are used except that the polyvinyl chloride is replaced by 90 parts of polyvinyl chloride and 10 parts of a copolymer of 50% vinyl chloride and 50% methyl methacrylate.

Examples 2 to 7 have the anti-fogging, anti-tackifying and gas diffusion properties of the compound of Example 1.

Representative films (about ¾ mil) made from the composition of the examples were used to wrap consecutively cut slices of rumpsteak and the results compared with control specimens wrapped in films of cellophane and in rubber hydrochloride film, all being tested for 24, 48 and 72 hours at 30°F. All samples remained red for 3 days showing that the films of this invention have oxygen permeability characteristics at least equal to that of films heretofore thought to be best for this purpose. Note was also taken of the lack of fog on the films of the present invention whereas fog was present on other films in these tests. Additionally, the films of the present invention had good anti-blocking properties at this high level of plasticizer. Attempts to make a conventional polyvinyl chloride film containing over 40 parts of conventional plasticizer result in blocked films which are unusable. Further, the conventional polyvinyl chloride film has inadequate anti-fogging properties under these conditions.

The anti-fogging property of the films is measured quantitatively by covering a 500 ml. beaker which contained distilled water at room temperature with a sample of film. The beaker is placed into an open top cooler at 32°F. The anti-fogging property is measured by the time required for the water condensate that develops on the film surface to coalesce into a clear continuous layer. Anti-blocking properties are measured qualitatively by observation of the cling of the film to itself.

EXAMPLE 8

The procedure and composition of Example 1 are used except that the glycerol monooleate the polyoxyethylene (20) sorbitan monooleate and the alkyl phenol used therein are replaced separately and in turn with the disclosed partial esters 1, partial esters 2 and component 3 in the quantities disclosed.

Example 8 has anti-fogging, anti-tackifying and gas diffusion properties.

It will be understood that it is intended to cover all changes and modifications of the examples of the invention herein chosen for the purpose of illustration which do not constitute departures from the spirit and scope of the invention.

It is claimed is:

1. A film comprising polymeric vinyl resin, said vinyl resin being selected from the group consisting of polyvinyl chloride, polyvinyl acetate, mixtures of polyvinyl chloride and polyvinyl acetate containing major proportions of polyvinyl chloride, copolymers of vinyl chloride with a monomer selected from the group consisting of vinyl acetate and $C_{1-8}$ alkyl esters of aliphatic-unsaturated acids having 3–5 carbon atoms per molecule, and copolymers of vinyl chloride with up to 15% by weight of $C_2$–$C_8$ mono olefins, and an antifogging and anti-tackifying agent, said agent being the combination of, on 100 parts by weight of said vinyl resin, 0.5 to 5 parts by weight polyalkoxylated alkyl phenol derived by condensation of 1 mol of alkyl phenol with an average of 3–50 mols of a $C_{2-4}$ alkylene oxide, 1 to 6 parts by weight partial ester (1) of a water soluble $C_{2-6}$ polyol with a $C_{12-18}$ aliphatic monocarboxylic acid and 0.5 to 5 parts by weight polyalkoxylated derivative of a partial ester (2) of a water soluble $C_{2-6}$ polyol and a $C_{12-18}$ aliphatic monocarboxylic acid, the alkoxy groups therein having 2–3 carbon atoms and the number of alkoxy groups being about 3–30 per molecule of said alkoxylated partial ester, the proportions of plasticizer being from about 20 to about 60 parts by weight for each 100 parts of polymeric vinyl resin and the total of said agents being at least 4 parts by weight when 40 or more parts of plasticizer are used.

2. The film of claim 1 which includes from 30 to 50 parts of a plasticizer per 100 parts of the vinyl resin.

3. The film of claim 2 wherein the polyalkoxylated alkyl phenol derivative is prepared by condensation of about 5–15 mols of ethylene oxide and alkyl phenol.

4. A plasticized red meat package film for keeping said meat red under refrigeration conditions and which film thickness is between about 0.1 mils and 2 mils, said film having good gas diffusion characteristics, anti-fogging properties and anti-blocking properties in approximately the proportions shown: 100 parts of polyvinyl chloride, 2–5 parts of glycerol monooleate, 1–3 parts of polyoxyethylene (20) sorbitan monooleate, 1–4 parts of alpha-(p-nonylphenyl)-omega-hydroxypoly-(oxyethylene) containing 3–50 mols of ethylene oxide and 40–60 parts of a substantially non-volatile plasticizer component for the resin, the total of the glycerol monooleate, the sorbitan monooleate, and the hydroxypolyoxyethylene being at least 5 parts.

* * * * *